Dec. 12, 1967 A. REINDL 3,358,233

PULSE TYPE RADIOTELEPHONE SYSTEM WITH CONFERENCE CAPABILITY

Filed Oct. 22, 1964 2 Sheets-Sheet 1

INVENTOR,
ADOLF REINDL

BY: Harry M. Saragovitz,
Edward J. Kelly,
Herbert Berl &
Julian C. Keppler
ATTORNEYS INVENTOR,
ADOLF REINDL
BY: Harry M. Saragovitz,
Edward J. Kelly,
Herbert Berl &
Julian C. Keppler
ATTORNEYS United States Patent Office 3,358,233
Patented Dec. 12, 1967

3,358,233
PULSE TYPE RADIOTELEPHONE SYSTEM WITH CONFERENCE CAPABILITY

Adolf Reindl, Long Branch, N.J., assignor to the United States of America as represented by the Secretary of the Army

Filed Oct. 22, 1964, Ser. No. 405,877
7 Claims. (Cl. 325—55)

ABSTRACT OF THE DISCLOSURE

This system provides circuitry whereby a pulse modulated radiotelephone system of the random access discrete address type may be utilized for conference calls. Each of the conferee's conversations are transmitted to the station of the conference leader on one address, or group of frequencies, and are re-transmitted to all conferees, together with the leader's signal, on a second address. A servo loop between each conferee and the leader automatically adjusts the timing of the pulses emitted by each conferee's transmitter, so that all conferees' pulses reach the leader's receiver at the same time.

Figure 1:
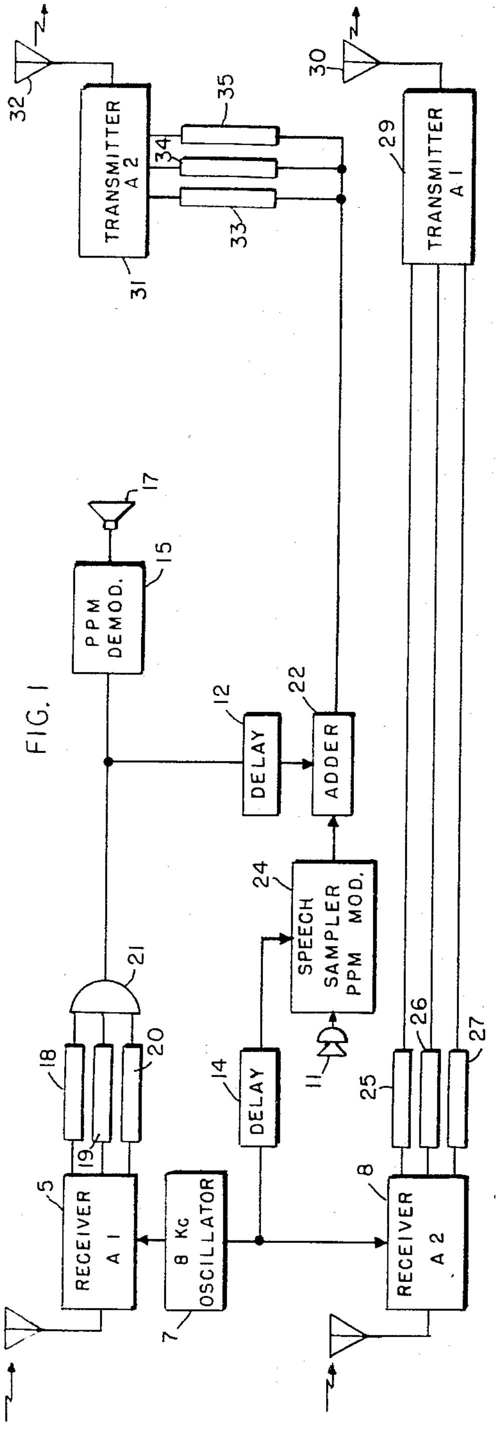

The invention described herein may be manufactured and used by or for the Government for governmental purposes without the payment of any royalty thereon.

The present invention relates to a radiotelephone system and more particularly to a technique for permitting conference calls with any number of conferees in a random access discrete address radiotelephone system. In the basic random access discrete address (RADA) system, each party or station has a discrete address which enables any party to select any one of a large number of other stations for communication. Communication is carried on by pulse modulating three carrier frequencies sequentially, with a predetermined spacing between the three modulated pulses of RF, the three carrier frequencies and the predetermined spacing together constituting the unique discrete address of any station. The intelligence to be transmitted is periodically sampled and the amplitude of each sample converted to some type of pulse modulaiton. The pulse modulation is then applied to all three carriers. The three carriers are then transmitted with the predetermined spacing characteristic of the address of the called station. The called station is simultaneously tuned to all three of the carrier frequencies constituting its address. The three trains of received modulated pulses are individually time delayed by different amounts such that the pulses of the three delayed pulse trains will coincide in time. By applying the delayed pulse trains to the inputs of an AND gate, a single modulated pulse train is obtained and other groups of pulse trains having pulse spacing corresponding to other addresses are discriminated against.

A system of the above-described type is satisfactory for two-party communication, but does not permit conference calls in which three or more parties communicate simultaneously. The present invention comprises a technique for providing a RADA system with a conference capability with a minimal amount of additional equipment at each station.

Briefly stated, in the conference mode of operation, all of the conferees' conversations are transmitted to the station of the conference leader on one address or group of frequencies and are re-transmitted to all of the conferees on a second address, together with the conference leader's signal. In order to reduce noise at the receiver of the conference leader and to prevent interference between the transmitted and received signals at the leader's station, all of the pulse trains from all of the conferees are arranged to arrive at the leader's receiver during a predetermined narrow time interval. This is accomplished by means of an auxiliary servo control loop between each conferee's station and the leader's station.

It is therefore an object of the invention to provide a novel and useful radiotelephone system in which several stations may hold conferences.

It is another object of the invention to provide a radiotelephone network in which communication is carried on by means of pulse modulated carrier waves and in which conference calls may be made between several stations of said network.

It is another object of this invention to provide a duplex radiotelephone system with a conference capability.

Figure 2:
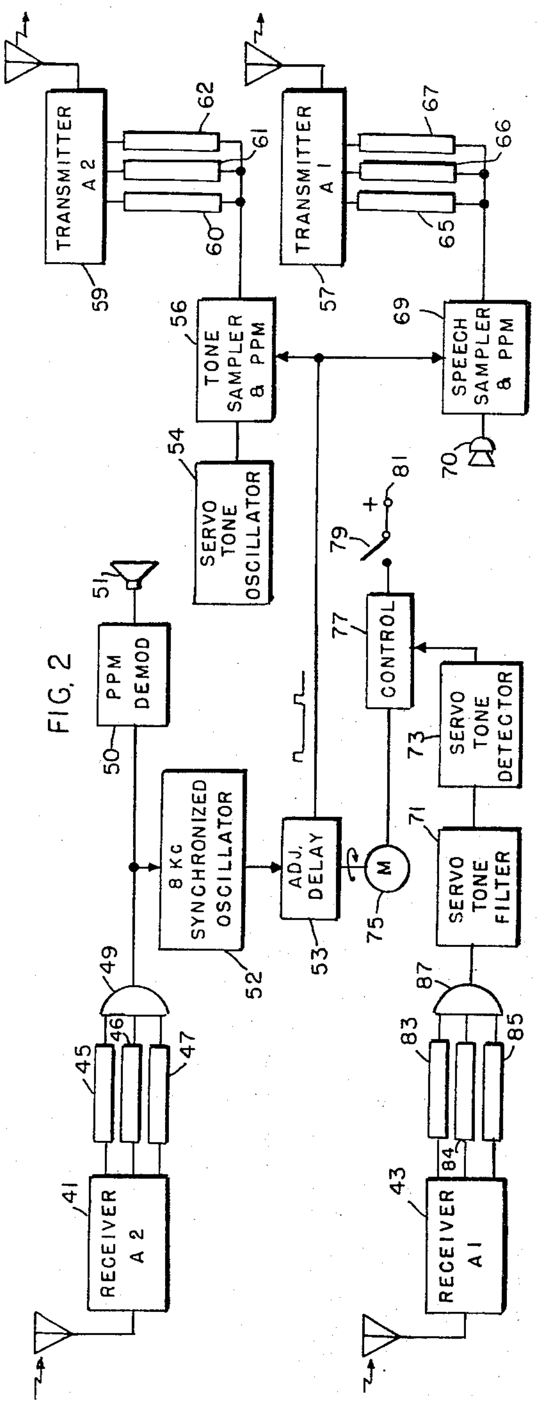
Figure 3:
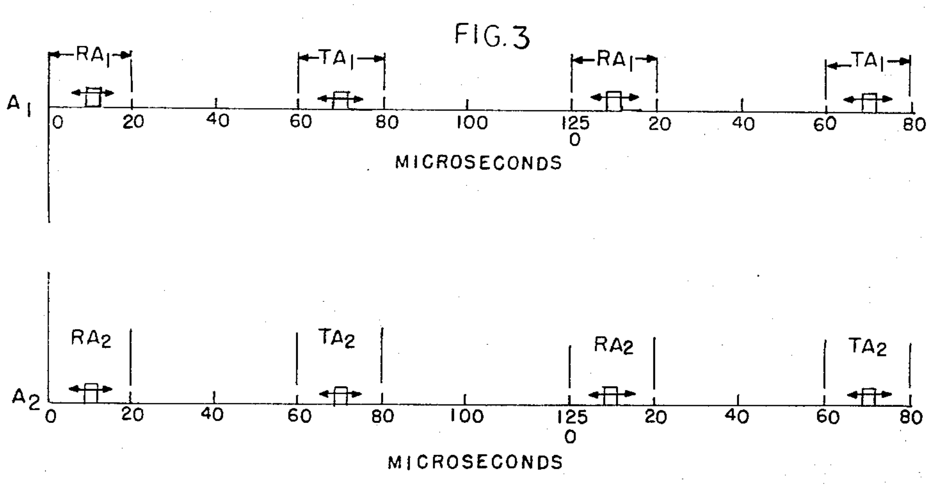

These and other objects and advantages of the invention will become apparent from the following detailed description and drawings, in which:

FIG. 1 is a block diagram of the circuitry of the station of a conference leader and FIG. 2 is a like diagram of a station of each of a number of conferees. FIGS. 3 and 4 are waveforms illustrating the operation of the circuitry of FIGS. 1 and 2.

Figure 4A:
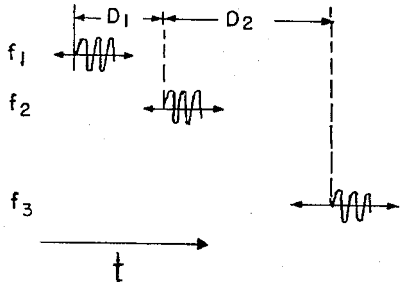
Figure 4B:
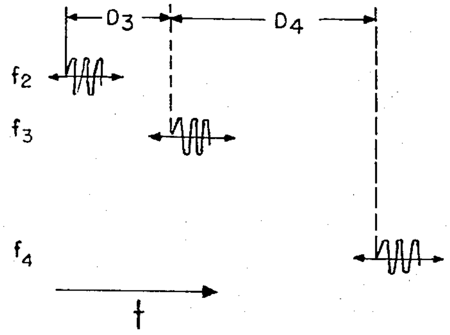

FIG. 4 illustrates the principle of operation of the random access discrete address system. In FIG. 4*a* are shown three pulses of radio frequency emitted by a RADA transmitter. Each pulse is one of a train of modulated pulses, the modulation on each pulse representing the instantaneous amplitude of a periodically sampled intelligence wave to be transmitted. The first pulse is at carrier frequency $f_1$, the second at $f_2$ and the third at $f_3$. The second pulse of RF is delayed by $D_1$ microseconds relative to the first pulse and the third by $D_2$ microseconds relative to the second. All three pulses are simultaneously modulated with the intelligence to be transmitted. If pulse position modulation is employed for example, all three pulses would move back and forth along the time axis in unison in response to the modulation, as indicated by the double-headed arrows. The three carrier frequencies and the delays $D_1$ and $D_2$ define a discrete address and the illustrated signal will be picked up only by a receiver arranged to decode this particular address. Such a receiver would have three channels each tuned to a different one of the three carrier frequencies. The three channels would be applied after detection to three delay lines. The delay line of the $f_3$ channel would have a certain delay, which could be zero, the $f_2$ channel delay would be $D_2$ microseconds greater than the $f_3$ channel delay and the $f_1$ channel delay $D_1$ plus $D_2$ microseconds greater than $f_3$ channel delay. Thus the outputs of the three delay lines will coincide in time for input signals corresponding to the address of the receiver. The delay line outputs are applied to the inputs of an AND gate, the output of which is a single modulated pulse train. In FIG. 4*b* is shown another signal comprising carrier frequencies $f_2$, $f_3$ and $f_4$ with time delays $D_3$ and $D_4$ which are characteristic of another address.

In the present radiotelephone system, a predetermined conference group will comprise a number of stations which communicate on a pair of addresses. The conference leader will have certain circuitry at his station as illustrated in FIG. 1 and each conferee will have the circuitry of FIG. 2. Each station may have the circuitry of both FIGS. 1 and 2 and therefore any station may be the leader. In initiating a call, the conference leader establishes in each frame a receiving and transmitting interval on each of two addresses, $A_1$ and $A_2$. In FIG. 3 is shown a receiving interval $RA_1$ on address $A_1$, a coincident receiving interval $RA_2$ on address $A_2$, a transmitting interval, $TA_1$ on address $A_1$ and a coincident transmitting interval, $TA_2$, on address $A_2$. The diagrams of FIG. 3 represent one full frame plus a portion of a second frame of the addresses $A_1$ and $A_2$. The sampling rate for speech is 8000 c.p.s., hence each frame is 125 microseconds in length and one RF pulse is emitted during each frame. During the interval $RA_1$ the conference leader receives all of the conversations of the conferees. These signals are then re-transmitted to all conferees during the interval $TA_2$, together with the conference leader's own conversation. The transmitting and receiving intervals $RA_2$ and $TA_1$ form part of a servo loop for automatically adjusting the conferees' sets so that all of the conferees' signals arrive at the leader's station during the interval $RA_1$. When setting up a conference, the leader will transmit an audio tone or a voice signal during interval $TA_2$. All of the conferees continually monitor address $A_2$ and the receipt of the leader's signal will alert the conferees. At each of the conferee's stations, the leader's three transmitted pulse trains with the audio tone or voice signal modulated thereon are decoded and combined into a single pulse train, as explained above, and then demodulated. The received pulse train is used to synchronize the 8 kc. sampling frequency oscillator of each conferee's station. The output of the 8 kc. sampling frequency oscillator of each conferee is applied to an adjustable delay means, the output of which determines the sampling rate or pulse repetition rate of a pair of transmitters at the station. One of the conferee's transmitters emits a distinctive audio tone or address $A_2$. By adjusting the delay means the phase and frequency of the RF pulses emitted by the conferees' transmitters will be varied. By adjusting the phase of the signal emitted by the conferee's station, the phase of the same signal at the leader's receiver will vary correspondingly and will eventually fall into the leader's receiving interval $RA_2$. The conferee's distinctive tone will then be detected, delayed by a fixed amount and re-transmitted on address $TA_1$. The reception of his distinctive tone from the leader by the conferee is an indication that the conferees' transmitter is operating at such a phase that his transmitted signals from both transmitters are arriving at the leader's station during the contemporaneous intervals $RA_1$ and $RA_2$. A servo system detects the reception of the tone and automatically halts the adjustment of the adjustable delay means and communication can thereafter proceed on addresses $A_1$ and $A_2$.

Referring now to FIG. 1, the conference leader's station comprises a pair of receivers 5 and 8 tuned respectively to addresses $A_1$ and $A_2$. The 8 kc. sampling frequency oscillator 7 has its output connected to both receivers, thus opening the receiver signal paths during the intervals $RA_1$ and $RA_2$. The three channels of receiver 5 are applied to the three delay lines 18, 19, and 20 and thence to the three inputs of AND gate 21. The output of 21 is applied to PPM demodulator 15, the output of which feeds loudspeaker or headphone 17. The output of AND gate 21 is also applied to one input of adder 22 via delay means 12. The other input of adder 22 is the output of speech sampler and PPM modulator 24. The leader's microphone 11 provides the signal input to 24 and the timing input is provided by the output of oscillator 7 which is delayed by passage through delay means 14. The output of adder 22 is applied to three delay means 33, 34 and 35, the outputs of which are applied to transmitter 31, which emits a signal on address $A_2$. The three output channels of receiver 8 are applied to the transmitter 29 for retransmission to all conferees after passage through delay means 25, 26 and 27. The circuitry of each conferee's station shown in FIG. 2 comprises a pair of receivers 41 and 43 tuned respectively to addresses $A_2$ and $A_1$. These receivers are different from the leader's receivers in that the signal paths therein are opened to admit the pulses by means of a self-contained oscillator which is synchronized with the detected video pulse train. Thus no external oscillator such as 7 of FIG. 1 is required. The signal paths of receivers 41 and 43 therefore are in effect opened by the received signals and reception is not constrained to a fixed interval as at the leader's station. The three output channels of receiver 41 are delayed by different amounts in delay means 45, 46 and 47 and applied to the AND gate 49, the output of which is a single train of position modulated video pulses. The delay means 83, 84 and 85 and AND gate 87 perform a similar function for the output of receiver 43. The output of AND gate 49 is applied to PPM demodulator 50 and thence to loudspeaker 51. The output of AND gate 49 is also applied to 8 kc. synchronized oscillator 52 as a synchronizing signal therefor. The output of oscillator 52 passes through adjustable delay means 53, and the delayed output thereof is applied as a timing or sampling signal to tone sampler and pulse position modulator 56 and speech sampler and pulse position modulator 69. The modulation signal input of 56 is servo tone oscillator 54 and the like input of 69 is the conferee's microphone 70. The output of 56 is a train of modulated pulses which are delayed by the different amounts characteristic of address $A_2$ by delay means 60, 61 and 62 and then applied to transmitter 59, where the three video pulse trains are converted to RF pulse trains at the proper frequencies. The delay means 65, 66, and 67 and transmitter 57 perform a similar function for the output of speech sampler and pulse position modulator 69, transmitting the output thereof on address $A_1$. The output of AND gate 87 passes throuhg servo tone filter 71, servo tone detector 73 and thence to control circuit 77. The motor 75 is arranged to automatically vary the adjustment of delay means 53. The motor is controlled by 77 and switch 79. When 79 is closed power is applied to the motor via 77. The reception of the conferee's unique servo tone by receiver 43 produces an output from 87, 71, and 73 which halts the motor through control circuit 77.

The operation of the network is as follows. All of the conferees monitor the address $A_2$ with their receiver 41. When the leader desires to set up a conference he transmits on address $A_2$ via transmitter 31 in interval $TA_2$. This is accomplished by speaking into microphone 11 or applying a distinctive tone to 24 which would be recognized by the conferees. The output of 24 will be video modulated pulse train occupying the interval $TA_2$. This interval is defined by the delayed output of oscillator 7. The output of 7 is fed directly to receivers 5 and 8 to define the receiving intervals $RA_1$ and $RA_2$ therefor. Since $TA_2$ is displaced by 60 microseconds in time from $RA_1$ (see FIG. 3), the delay introduced by 14 is 60 microseconds. The output of 14 samples the modulation input to 24 at the rate of 8 kc. and converts it to a position or time modulated train of pulses. This pulse train is delayed by the different amounts characteristic of the address $A_2$ in delay means 33, 34 and 35 and then applied to transmitter 31 where the three video pulse trains are converted to RF pulse trains. Each conferee will pick up the leader's initial signal on receiver 41 and loudspeaker 51. Simultaneously the oscillator 52 of each conferee will be locked in phase with the oscillator 7 of the leader. It should be noted that even though the output of gate 49 is a PPM pulse train the oscillator 52 is arranged so that it cannot follow the modulation of the pulse train but only the basic repetition rate of 8 kc. Each conferee then closes switch 79 which starts motor 75, thereby adjusting delay means 53. Thus the output of delay means 53 will be gradually shifted in phase relative to the phase of the leader's 8 kc. oscillator. The output of 53 determines the sampling rate and timing of both transmitters 57 and 59. Each conferee has a distinctive tone for his oscillator 54. The tone sampler and pulse position modulator transmits this tone to the leader on address $A_2$ via transmitter 59, the timing or phase of the emitted pulse trains being determined by the output of the adjustable delay means 53. If the conferee's transmitted pulses do not reach the leader during the interval $RA_2$, the continuous shift in phase of the pulse train outputs of 59 caused by the adjustment of 53 will cause the received pulse trains at the leader's receiver 8 to slip or slide along the time axis relative to the fixed receiving interval $RA_2$. When the phase of the received pulse trains at the leader's station passes through $RA_2$, the conferee's signal will appear at the output of receiver 8. Each of the three pulse trains is then delayed by the delay means 25, 26, 27 and retransmitted on address $A_1$ from transmitter 29. The three pulse trains at the output of receiver 8 will have the spacing characteristic of address $A_2$. The delay means 25, 26 and 27 introduce different delays to the three pulse trains such that the outputs thereof will have the spacing characteristic of address $A_2$ and in addition will be delayed by 60 microseconds to correspond to the time difference between the interval $RA_2$ and $TA_1$. It should be noted that the signal transmitted by the leader from transmitter 29 will still have the conferee's distinctive audio tone modulated thereon. The tone filter 71 is tuned to each conferee's distinctive audio tone and serves to separate the particular conferee's tone from all of the other conferees' tones which may be simultaneously received. Detector 73 converts the output of filter 71 to DC which in turn shuts off motor 71 via control circuit 77. Thereafter the phase of the output of 53 will remain fixed at the proper value to insure that the conferee's transmissions will reach the leader during interval $RA_1$. The servo loop however may be periodically operated to check the adjustment. Thereafter the conference proceeds with each conferee sending his speech signal to the leader on address $A_1$, the leader retransmitting all of the received conferees' signals on address $A_2$, together with his own speech signal. Each conferee's speech signal from microphone 70 is converted to a train of modulated pulses in speech sampler and pulse position modulator 69 and then applied to transmitter 57. All of the conferees' speech signals are now picked up by receiver 5 of the leader, converted to a single pulse train by delay means 18, 19 and 20 and gate 21, demodulated by 15 and reproduced by speaker 17. All of the conferees' speech signals are also delayed by 60 microseconds in 12 and added to the leader's own speech signal in 22 for application to transmitter 31.

This it can be seen that all parties to the conference may talk simultaneously and all of the simultaneous conversations will be heard by all parties. This is an important feature of a military conference network since it permits any party, for example, the commanding officer, to break in on the conversation of any other two parties to the conference. While the invention has been illustrated in connection with a three-channel RADA system, it is obvious that the invention is useful with other pulse modulated communication systems, for example, those employing only a single train of modulated pulses. Also, the circuitry illustrated herein as part of a conference network may also serve alternately as part of the conventional RADA network in which each party has a separate address. Further, the speech and servo loop could be operated on the same address. This would mean that all four of the intervals $RA_1$, $TA_1$, $RA_2$ and $TA_2$ would be set up on a single address. Alternately, the servo loop may be frequency multiplexed with the speech system. This would involve transmitting the distinctive audio tones of the conferees as subsonic or supersonic signals which are added to the speech signals on a single address.

While the invention has been illustrated in connection with a specific embodiment, many modifications thereof are possible without departing from the inventive concepts disclosed herein, hence the invention should be limited only by the scope of the appended claims.

What is claimed is:

1. A radiotelephone conference network in which communication is carried on by means of pulse modulated carrier waves comprising, a conference leader's station and a plurality of conferees' stations, each of said stations having a pair of transmitters and a pair of receivers, one transmitter and one receiver tuned to a first address and the other transmitter and other receiver tuned to a second address, means at said leader's station for establishing two coincident receiving intervals on each of said addresses and means for establishing two coincident transmitting intervals on each of said addresses displaced in time from said receiving intervals, means at said leader's station to transmit modulated RF pulses to all of said conferees' stations during said transmitting interval from said other transmitter, an oscillator at each of said conferees' stations, means to synchronize said oscillator with the pulse repetition rate of the output of said other receiver, an adjustable delay means connected to the output of said oscillator, the output of said delay means determining the timing or phasing of the pulse trains emitted by said one transmitter and said other transmitter at each conferee's station, means to automatically adjust said delay means and means to transmit a distinctive audio tone from each conferee's station from said other transmitter, fixed delay means connected to the output of said other receiver at said leader's station, the output of said fixed delay means being applied to said one transmitter for retransmitting all of the conferees' distinctive tones, tone filter and detector means connected to the output of said one receiver at each conferee's station and means to halt the adjustment of said adjustable delay means upon reception of said distinctive audio tone from said leader's station, and means to communicate between all of said stations utilizing said one transmitter and said other receiver at each conferee's station and said one receiver and said other transmitter at said leader's station.

2. A radiotelephone conference network in which communication is carried on by means of pulse modulated carrier waves, comprising, a conference leader's station and a plurality of conferees' stations, each of said stations having a pair of transmitters and a pair of receivers, one transmitter and one receiver of each station tuned to a first address and the other transmitter and other receiver tuned to a second address, means at said leader's station for establishing contemporaneous receiving intervals on said first and second addresses and contemporaneous transmitting intervals spaced in time from said receiving intervals, means to transmit the speech signals of each conferee from his said one transmitter to said one receiver at said leader's station and means to re-transmit the speech signals of all conferees from said leader's station by means of said other transmitter together with the leader's speech signal, said other receiver of each conferee being adapted to receive all of said speech signals on said other receiver tuned to said second address.

3. The radiotelephone conference network of claim 2 in which said one receiver and said other transmitter at each conferee's station and said other receiver and said one transmitter at said leader's station constitute part of a servo loop for adjusting the phasings of the pulse trains emitted by each conferee's station so that all conferees' signals reach the leader's station during said receiving interval.

4. A radiotelephone conference network in which communication is carried on by means of pulse modulated carrier waves, comprising, a conference leader's station and a plurality of conferees' stations, means to transmit the conversation of each conferee to the leader's station on a first address and means at said leader's station to retransmit all of the conferees' conversations on a second address after a fixed time delay together with the leader's conversation, and means at each station to insure that the conversation of each conferee arrives at the leader's station during a small, fixed time interval.

5. The network of claim 3 in which said last-named means comprises, means for transmitting from each conferee's station on said second address a distinctive audio tone, means to retransmit said audio tone after a fixed time delay from said leader's station if it arrives during said small, fixed time interval.

6. A radiotelephone conference network in which communication is carried on by means of pulse modulated carrier waves, comprising, a conference leader's station and a plurality of conferees' stations, means to transmit the speech signal of each conferee to the leader's station on a first address and means at said leader's station to retransmit all of the conferees' speech signals on a second address after a fixed time delay together with the leader's speech signal, means for transmitting from each conferee's station on a second address a distinctive audio tone and means to retransmit said audio tone from said leader's station after a fixed time delay if it arrives during a narrow, fixed time interval.

7. A radiotelephone conference network in which communication is carried on by means of one or more trains of modulated pulses of radio frequency, comprising, a conference leader's station and a plurality of conferees' stations, means to transmit the speech signal of each conferee to the leader's station on a first address and means at said leader's station to retransmit all of the conferees' speech signals on a second address after a fixed time delay together with the leader's own speech signal, and a servo system for causing the pulses of all conferees to arrive at the leader's station during a fixed, narrow interval, said servo system comprising means to transmit a distinctive audio tone from each conferee's station on said second address, and means to adjust the phase of the pulse trains emitted by each conferee's station on both of said addresses, means at said leader's station to retransmit said distinctive audio tones on said first address after a fixed time delay if said audio tones arrive during a small, fixed time interval, and means at the station of each conferee to pick up the retransmission of his distinctive tone and automatically halt the adjustment of the phase of said pulse trains in response thereto.

References Cited

UNITED STATES PATENTS

| | | | |
|---|---|---|---|
| 2,446,819 | 8/1948 | Fyler | 343—178 |
| 2,471,416 | 5/1949 | Deloraine et al. | 343—178 X |
| 2,540,876 | 2/1951 | Hansell | 343—179 X |
| 3,104,392 | 9/1963 | Towler | 343—178 |
| 3,239,761 | 3/1966 | Goode | 325—55 X |
| 3,294,914 | 12/1966 | Muller | 325—3 X |

JOHN W. CALDWELL, *Primary Examiner.*

UNITED STATES PATENT OFFICE

CERTIFICATE OF CORRECTION

Patent No. 3,358,233 December 12, 1967

Adolf Reindl

It is hereby certified that error appears in the above numbered patent requiring correction and that the said Letters Patent should read as corrected below.

Column 3, line 28, before "means" insert -- of the delay --; line 35, after "address" insert -- $A_1$ during interval --.

Signed and sealed this 6th day of May 1969.

(SEAL)
Attest:

Edward M. Fletcher, Jr.
Attesting Officer

Edward J. Brenner
Commissioner of Patents